United States Patent [19]
Hewitt

[11] Patent Number: 5,752,307
[45] Date of Patent: May 19, 1998

[54] METHOD FOR APPLYING A HARD CUTTING EDGE TO A REPLACEABLE BIT FOR A CIRCULAR SAW

[75] Inventor: Keith H. Hewitt, Sandy, Oreg.

[73] Assignee: Pacific Saw and Knife Company, Portland, Oreg.

[21] Appl. No.: 715,099

[22] Filed: Sep. 17, 1996

[51] Int. Cl.⁶ .................................................. B22D 31/00
[52] U.S. Cl. ...................... 29/527.6; 164/66.1; 164/76.1; 164/80; 164/98
[58] Field of Search .................. 29/527.6; 164/66.1, 164/76.1, 80, 98, 105

[56] References Cited

U.S. PATENT DOCUMENTS

| | | |
|---|---|---|
| 227,514 | 5/1880 | Frary . |
| 1,434,047 | 10/1922 | De Bats . |
| 2,250,561 | 7/1941 | Wissler . |
| 2,688,168 | 9/1954 | Hurt . |
| 3,063,310 | 11/1962 | Connoy . |
| 3,553,905 | 1/1971 | Lemelson . |
| 3,674,083 | 7/1972 | Stier et al. . |
| 3,854,898 | 12/1974 | Whitney, Jr. et al. . |
| 3,889,093 | 6/1975 | Fawcett et al. ............ 228/122.1 X |
| 3,889,741 | 6/1975 | Stier et al. . |
| 4,889,025 | 12/1989 | Collett . |
| 5,101,879 | 4/1992 | Beck et al. . |

*Primary Examiner*—Carl J. Arbes
*Attorney, Agent, or Firm*—Klarquist Sparkman Campbell Leigh & Whinston, LLP

[57] ABSTRACT

A replaceable bit for a circular saw is provided with a cutting portion of hard metal alloy by machining off the original cutting portion, supporting the remaining base metal portion such that a predetermined selected part extends into a chill mold, melting the surface of the selected part using a plasma arc welding torch, feeding a rod of the hard alloy into the plasma jet of the torch such that melted material from the rod drips into the mold cavity to fill it, the melted alloy mixing with the melted surface of the selected part of the remaining base metal portion in a transition zone, allowing the melted mass of hard alloy to cool and harden into a dome shape in the mold cavity, removing the bit from the mold cavity, and grinding the flank, face and back regions of the new cutting portion to selected final dimensions. Apparatus suitable for performing the process is disclosed.

6 Claims, 2 Drawing Sheets

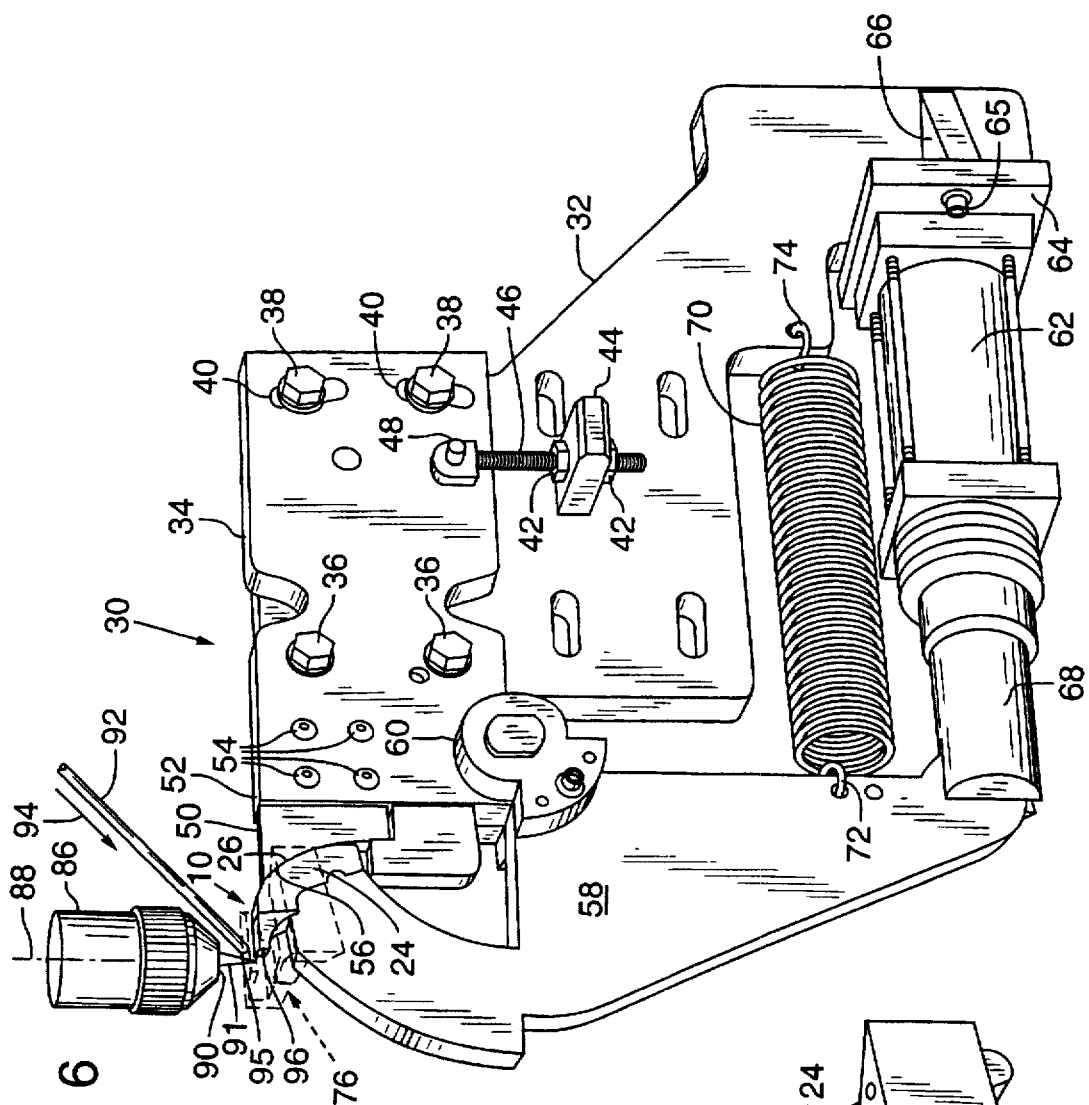
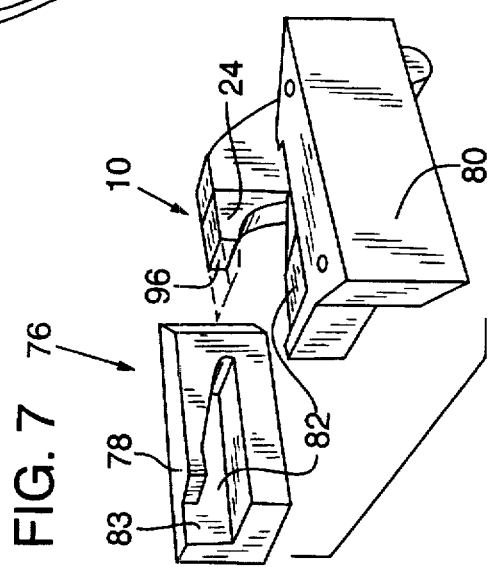

5,752,307

METHOD FOR APPLYING A HARD CUTTING EDGE TO A REPLACEABLE BIT FOR A CIRCULAR SAW

FIELD OF THE INVENTION

This invention relates to the art of applying a hard material, such as Stellite® metal alloy, tungsten carbide, or high speed steel, to a replaceable cutting tooth for a circular saw.

More particularly, the invention relates to the art of providing a replaceable bit for a circular saw, originally provided with either an ordinary carbon steel tip or, in the case of a retipping operation, with a Stellite® or other hard metal alloy tip, with a new cutting portion of a material substantially harder than the base metal portion of the bit.

BACKGROUND OF THE INVENTION

Circular saws are often equipped with replaceable teeth known as bits. A bit comprises a crescent-shaped steel holder having a wedge-shaped cutting portion. The cutting portion typically comprises a pair of flank regions, a face region, and a back region joining the face region to form a wedge-shaped cutting tip.

The crescent-shaped holder typically comprises a generally convex outer surface and a generally concave inner surface opposed thereto. The inner surface is engaged by a generally semi-circular shank. The bit is held within the saw by means of the tension created by the shank.

Collett U.S. Pat. No. 4,889,025 discloses a prior art bit wherein the cutting portion comprises a tungsten carbide insert soldered or brazed into a slot in the cutting tip of the bit. Tungsten carbide, of course, is much harder than ordinary carbon steel. However, if the soldered joint is partially contaminated during fabrication, it is possible for the sharp insert to be dislodged during use, thereby to create a potential source of danger.

Another type of prior art bit comprises flank and back regions which are ground 0.015 inch and to which are applied facings of Stellite®.

Saws including circular saws having fixed cutting teeth, i.e., saws not equipped with replaceable bits, have been provided heretofore with cutting portions of a metal alloy harder than the base metal of the saw itself. The art employed uses a water-cooled chill mold made of a pair of mold components which move toward and away from each other and between which the saw blade itself passes.

As each tooth on the saw blade passes between the mold components, jaws are applied to seal the components against the tooth. A plasma arc welding torch typically melts a portion of the tooth to a surface which becomes the weld line at which the new cutting portion is to be bonded. Hard material, such as Stellite®, from a rod or wire placed adjacent the mouth of the torch, is also melted. The melted hard material drips into the mold cavity, whereupon it forms an intimate bond with the melted softer base metal of the saw at the weld line, thereby to become an integral part of the saw plate.

The welding torch is then shut down and the molten Stellite® or other alloy is allowed to harden within the water-cooled chill mold components. The mold is opened, whereupon the saw blade is indexed to allow the start of another tipping cycle.

It is possible to utilize the plasma arc welding torch to melt the original steel tip, or in the case of a retipping operation, the old remaining Stellite® tip, because in a circular or band saw the sides of the saw are parallel to each other. This provides enough space in the bottom of the mold cavity to accommodate the material that is melted away.

Stier et al., U.S. Pat. Nos. 3,674,083 and 3,889,741, and Beck et al., U.S. Pat. No. 5,101,879, all assigned to Vollmer Werke Maschinenfabrik GmbH, Biberach/Riss, Germany, illustrate the process involved as respects fixed tooth saws. Tipping and grinding apparatus suitable for performing the process on saws with fixed teeth are also manufactured and sold by Ets Alligator, 22 Avenue de Friedland, 75008, Paris, France. Such apparatus is distributed in the United States by Pacific/Hoe Saw and Knife Company, assignee of the instant invention.

It has long been desired to be able to apply this mold tipping process to replaceable bits for circular saws. A principal reason is that ordinary carbon steel, from which replaceable bits are made, costs only a fraction as much as high speed steel or Stellite® alloy. Thus, it is desirable to use as little of the more expensive alloy as possible. Furthermore, whereas a replaceable bit can be made entirely from high speed steel, such a bit cannot be made entirely from tungsten carbide or Stellite®, because such materials are entirely too brittle.

Accordingly, it is a principal object of the present invention to provide a method and apparatus for bonding a cutting portion of tungsten carbide, high speed steel, or Stellite® metal alloy to the body of an ordinary carbon steel replaceable bit for use in circular saws.

It is a further object of the present invention to provide a replaceable bit for use in circular saws that will have a cutting portion made of tungsten carbide, high speed steel, or Stellite® alloy, and which bit will be superior to presently available replaceable bits, notwithstanding the latter be made with tungsten carbide inserts or with thin Stellite® facings on their flank and back regions.

SUMMARY OF THE INVENTION

My method applies a new cutting portion onto a replaceable bit having either its original carbon steel cutting portion or, in the case of a retipping operation, a worn or dull cutting portion of harder material.

The cutting portion is defined as having a pair of flank regions, a face region, and a back region joining the face region at a cutting tip. The holder for the cutting portion of the bit, or the base metal portion of the bit as it will be referred to herein, is generally crescent-shaped and has a generally convex outer surface adjacent the back region of the cutting portion. The holder also has a generally concave inner surface opposed to the outer surface.

A shank engages the concave inner surface, thereby to retain the bit in position in the saw.

The method comprises first machining off the original cutting portion to leave a surface on the remaining base metal portion. The machining can be done either by grinding or milling.

The convex outer portion of the remaining base metal portion is then supported such that a selected part extends into a water-cooled chill mold. The mold has a cavity generally configured to form the new cutting portion of the bit. The cavity is further configured to confine the flank, face, and back regions of the new cutting portion when so formed.

Inasmuch as the flank regions of the cutting portion are not parallel to each other, and the cutting portion closely conforms to the cavity shape, there is insufficient room to accommodate any melted material that would result if the original cutting portion were melted to remove it from the original base metal portion. The cavity, however, is adapted to receive a mass of material harder than the base metal of the bit to form the new or replacement cutting portion.

The surface of the remaining base metal portion, that is, the surface of the selected part that extends into the mold, is, however, melted, as by a plasma arc welding torch. The mass of harder material is also melted such that it flows or drips into the mold cavity, generally to form the flank, face, and back regions of the new cutting portion. The mass of harder material mixes with the melted surface of the selected part of the remaining base metal portion to form a transition zone.

The melted mass of harder material is allowed to cool and harden in the mold cavity. The mold is then opened and the bit is removed. The flank, face, and back regions are then ground to selected final dimensions to form a new sharp cutting tip, the cutting portion being welded or bonded to the remaining base metal portion of the bit at the transition zone.

The apparatus of my invention comprise a chill mold having a cavity as aforesaid, the cavity being open at its top to receive the mass of harder material. The apparatus further comprises means for providing the mass of harder material to the cavity. The apparatus further comprises a torch having a mouth disposed above and directed into the open top of the mold cavity. The torch is adapted to melt the mass of harder material such that the mass, when melted, flows or drips into the mold cavity generally to form the flank, face, and back regions of the new cutting portion.

My apparatus further comprises a frame which supports a seat which, in turn, supports the convex outer surface of the base metal portion of the bit in a manner such that the selected part of the base metal portion extends into the mold cavity. A clamp is pivotally attached to the frame to clamp the concave inner surface of the base metal portion of the bit securely to retain the bit against the seat. Finally, an actuator is provided, adapted selectively to pivot the clamp into engagement with the bit while the torch is melting the mass of harder material, and to retract the clamp to release the bit when the mass of harder material has cooled.

BRIEF DESCRIPTION OF THE DRAWINGS

FIG. 6 is a perspective view of apparatus used in the invention to support the bit during the molding operation and illustrating the position of the torch.

FIG. 7 is a perspective view of the chill mold assembly used in the invention and illustrating the position of the bit with respect thereto.

DETAILED DESCRIPTION OF THE PREFERRED EMBODIMENT

Figure 1:
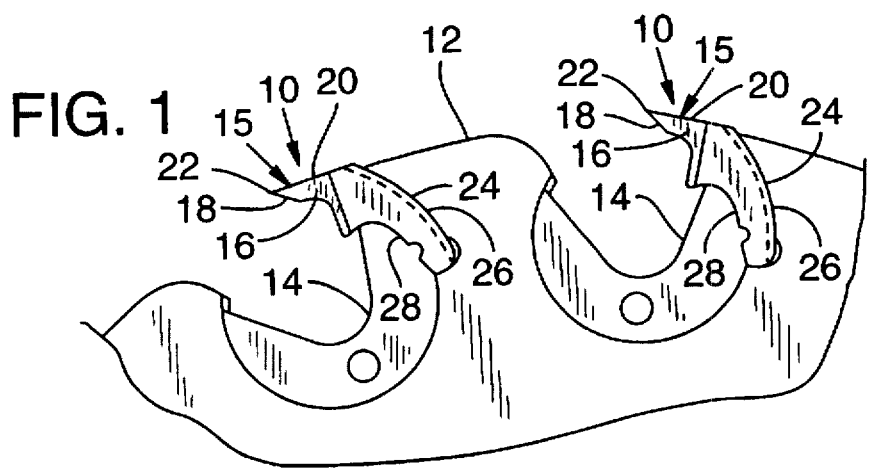
FIG. 1 is a side elevational view of a portion of a circular saw provided with a plurality of inserted cutting teeth or bits made in accordance with the present invention.

Referring to the drawings, FIG. 1 illustrates a plurality of inserted cutting teeth or bits 10 installed in a circular saw 12. Each bit 10 is held in place by means of a generally semi-circular shank 14.

Referring to FIGS. 1, 2, 4 and 5, each bit 10 has a cutting portion 15 which comprises a pair of flank regions 16, a face region 18, and a back region 20. Back region 20 joins face region 18 at a cutting tip 22. Bit 10 further comprises a holding and supporting portion or holder 24 which supports cutting portion 15. Holder 24 will also be referred to herein, especially during the description of the actual molding and tipping operation, as the base metal portion 24 of bit 10.

Holder or base metal portion 24 has a generally crescent-shaped or convex outer surface 26 adjacent back region 20 and a generally concave inner surface 28 opposed to outer surface 26. Inner surface 28 lies adjacent face region 18 and is adapted to be engaged by shank 14 to retain bit 10 within saw 12.

During the molding operation holder or base metal portion 24 of bit 10 is placed in the apparatus 30 illustrated in FIG. 6. Apparatus 30 comprises a frame 32 to which a bit seat holder 34 is adjustably attached by a first pair of bolts 36 and a second pair of bolts 38 received in elongated slots 40. Holder 34 is pivotally adjustable for molding alignment purposes by a pair of adjusting nuts 42 which exert pressure on a shoulder 44 attached to frame 32 and receive a threaded spindle 46 attached to holder 34 at a pivot 48.

A bit seat 50 is attached to the forward end 52 of holder 34 by threaded fasteners 54. Seat 50 is concavely curved at its forward face 56 to conform to and support convex outer surface 26 of holder or base metal portion 24 of bit 10.

A clamping arm 58 is attached to frame 32 by a clamping pivot 60. An actuator comprising a clamping cylinder 62, mounted horizontally to a base plate 64 attached to frame 32 by bolts 65 attached to horizontal support plates 66, is adapted to rotate clamping arm 58 by means of a piston 68. Piston 68 rotates clamping arm 58 clockwise against base metal portion 24 of bit 10, thereby to retain portion 24 against seat 50 during the molding operation. A coil spring 70 attached at its ends 72, 74 to clamping arm 58 and frame 32, respectively, urges clamping arm 58 counterclockwise to facilitate removal of bit 10 after the molding operation.

As illustrated in FIGS. 6 and 7, a chill mold 76 made of copper and comprising retractable mating mold components 78, 80, is mounted forwardly of seat 50 on frame 30. Mold 76 provides a mold cavity 82 generally configured to receive the selected part of base metal portion 24 and to form a new cutting portion 15 for bit 10. Cavity 82 is open at its top 83 and is configured to confine flank, face and back regions 16, 18, 20 of the new cutting portion 15 when it is formed.

Figure 3:
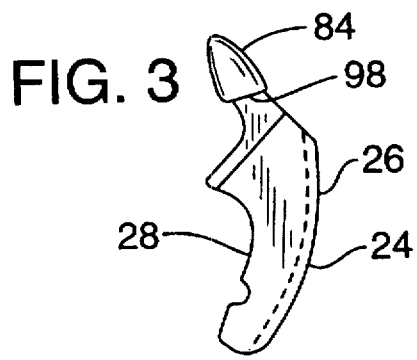
FIG. 3 is a side elevational view of the bit of FIG. 2 after the mass of harder material has been allowed to cool and harden in the mold cavity.
Figure 4:
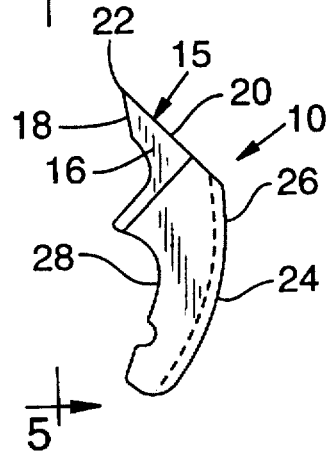
FIG. 4 is a side elevational view of the bit of FIG. 3 after the flank, face and back regions have been ground to final dimensions to form the new sharp cutting tip.

When cavity 82 is filled with molten hard material, a dome 84 (see FIG. 3) of the material collects in the region of cutting portion 15. Dome 84 generally conforms to the desired final shape of cutting portion 15.

As further illustrated in FIG. 6, a plasma arc welding torch 86 is adjustably mounted in the direction of its own axis 88 such that its mouth 90 is disposed above and directed into the open top 83 of mold 76.

As also illustrated in FIG. 6, a rod 92, which may comprise a rod of high speed steel, tungsten carbide, Stellite® metal alloy, or other hard metal alloy, is fed by a feeding means of known design (not shown) in the direction of arrow 94 to a position such that its lower end 95 is adjacent mouth 90 of torch 86 and above the open top 83 of mold 76. Thus, when a plasma jet 91 (the flame) is directed out of mouth 90, hard metal alloy is melted from end 95 of rod 92 to drip into and fill mold cavity 82.

The Process

Figure 2:
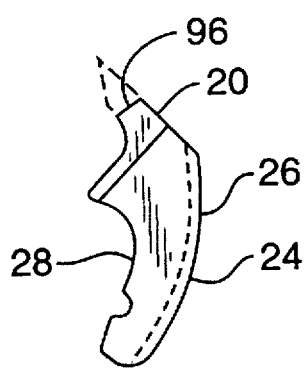
FIG. 2 is a side elevational view of a replaceable bit for use in the saw of FIG. 1 after its original carbon steel cutting portion, or in the case of a retipping operation, the worn or dull cutting portion of harder material has been machined off.

The first step in my process is to remove by machining the original cutting portion 15. See FIG. 2. The machining can be accomplished either by grinding or by milling. This must be done whether bit 10 has a cutting portion 15 of ordinary carbon steel, or whether bit 10 has been previously tipped with Stellite® or some other hard metal alloy. FIG. 2 illustrates a bit 10 after cutting portion 15 has been machined off.

In practicing the process disclosed in the aforementioned Vollmer patents Nos. 3,674,083, 3,889,741 and 5,101,879 and when using the aforementioned Alligator apparatus, the original cutting portion, or in the case of a retipping operation, the old remaining Stellite® cutting portion, is melted by a plasma arc welding torch. This is possible because inasmuch as the sides of a saw (not having replaceable teeth) are parallel to each other, there is sufficient space in the bottom of the mold cavity to accommodate the melted material that formed the original cutting portion.

Figure 5:
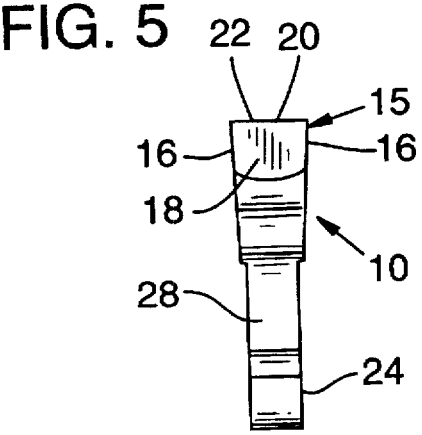
FIG. 5 is a view taken on line 5—5 of FIG. 4.

Using the plasma arc welding torch to melt away the material of the original cutting portion 15 of an individual replaceable bit 10 is not possible because the flank regions 16 are not parallel to each other, as can clearly be seen in FIG. 5. There is simply insufficient room in mold cavity 82 to accommodate any melted material that would result if original cutting portion 15 were melted to remove it from the holding and supporting portion 24.

After original cutting portion 15 is machined off, the remaining base metal portion 24 of bit 10 is placed in apparatus 30 such that its convex outer surface 26 is held firmly against the forward face 56 of bit seat 50 by the force exerted by piston 68 on clamping arm 58. Apparatus 30 is adjusted so that a predetermined selected part of portion 24 extends into cavity 82 of mold 76.

Torch 86 is then activated to melt the forward surface 96 of portion 24 as well as hard material from end 95 of rod 92. The mass of hard material from rod 92 flows into mold cavity 82 generally to form the flank, face and back regions 16, 18, 20 of the new cutting portion 15. The molten hard material mixes with the melted surface 96 of portion 24 to form a transition zone 98. See FIG. 3.

The molten hard material is allowed to cool in the mold cavity such that dome 84 is formed. See FIG. 3. Piston 68 is unpressurized and then retracted by spring 70 to open clamping arm 58 and permit the removal of bit 10.

The flank, face and back regions 16, 18, 20 of new cutting portion 15 are then ground to their selected final dimensions to form the new cutting tip 22. See FIGS. 4 and 5. The new cutting portion 15 is bonded to the holder or base metal portion 24 at the transition zone 98. Bit 10 is then typically "blued" for aesthetic purposes, and when that is done, transition zone 98 is clearly visible to the naked eye.

I claim:

1. A method of providing a replaceable bit for a circular saw with a new cutting portion formed of a material substantially harder than the base metal portion of the bit which carries the cutting portion, the cutting portion having a pair of flank regions, a face region, and a back region joining the face region at a cutting tip, the base metal portion being generally crescent shaped and having a generally convex outer surface adjacent the back region of the cutting portion and a generally concave inner surface opposed to the outer surface, the inner surface being adapted to be engaged by a generally semi-circular shank and thereby retained in position in the circular saw, the method comprising:

machining off the original cutting portion of a replaceable bit to leave a surface on the remaining base metal portion of the bit;

supporting the convex outer surface of the remaining base metal portion of the bit such that a predetermined selected part thereof extends into a chill mold having a cavity generally configured to form the new cutting portion of the bit, the cavity being further configured to confine the flank, face, and back regions of the new cutting portion of the bit when so formed, the cavity being further adapted to receive a molten mass of harder material;

melting the surface of the selected part of the remaining base metal portion of the bit;

melting a mass of material substantially harder than the metal of the base metal portion of the bit such that the molten mass of harder material flows into the mold cavity generally to form the flank, face, and back regions of the new cutting portion of the bit, the molten mass of harder material mixing with the melted surface of the selected part of the remaining base metal portion of the bit to form a transition zone;

allowing the molten mass of substantially harder material to cool and harden in the mold cavity;

removing the bit from the mold cavity; and grinding the flank, face and back regions of the new cutting portion of the bit to selected final dimensions to form a new cutting tip of substantially harder material than the base metal portion of the bit.

the new cutting portion being bonded to the remaining base metal portion of the bit at the transition zone.

2. The method of claim 1, wherein the generally convex outer surface and the generally concave inner surface of the remaining base metal portion of the bit are clamped with the selected part of the remaining base metal portion extending into the chill mold.

3. The method of claim 1, wherein the melting of the surface of the selected part of the remaining base metal portion of the bit and the melting of the mass of substantially harder material comprise melting by a plasma arc welding torch.

4. The method of claim 3, further comprising feeding a rod of the substantially harder material into the plasma jet of the plasma arc welding torch such that melted material from the rod drips into the mold cavity to fill the same.

5. The method of claim 1, wherein the mass of substantially harder material comprises high speed steel.

6. The method of claim 1, wherein the mass of substantially harder material comprises tungsten carbide steel.

* * * * *